(12) United States Patent
Berg (10) Patent No.: US 9,976,854 B2
(45) Date of Patent: *May 22, 2018

(54) GEODETIC INSTRUMENTS AND METHODS OF OPERATING GEODETIC INSTRUMENTS

(71) Applicant: Trimble AB, Danderyd (SE)

(72) Inventor: Ulf Berg, Danderyd (SE)

(73) Assignee: Trimble AB, Danderyd (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/369,615

(22) Filed: Dec. 5, 2016

(65) Prior Publication Data

US 2017/0082431 A1    Mar. 23, 2017

Related U.S. Application Data

(63) Continuation of application No. 15/172,013, filed on Jun. 2, 2016, now Pat. No. 9,541,391, which is a
(Continued)

(51) Int. Cl.
*G01C 9/06* (2006.01)
*G01C 15/00* (2006.01)

(52) U.S. Cl.
CPC .............. *G01C 9/06* (2013.01); *G01C 15/002* (2013.01)

(58) Field of Classification Search
CPC ................................ G01C 9/06; G01C 15/002
(Continued)

(56) References Cited

U.S. PATENT DOCUMENTS 6,314,651 B1    11/2001 Ohtomo et al.
6,504,602 B1 *  1/2003 Hinderling ............... G01C 1/02
                                                         356/141.1
(Continued)

FOREIGN PATENT DOCUMENTS

EP    1 903 304 A2    3/2008
WO    2007/110141 A1   10/2007

OTHER PUBLICATIONS

International Application No. PCT/EP2013/075654, International Search Report and Written Opinion dated Oct. 6, 2016, 9 pages.
(Continued)

*Primary Examiner* — Christopher Fulton
(74) *Attorney, Agent, or Firm* — Kilpatrick Townsend & Stockton (57) ABSTRACT

Embodiments provide for a geodetic instrument comprising a scanning head, a reflecting optical element, a radiation source, a control unit and an electronic distance measurement (EDM) unit. The scanning head is rotatable about a first axis. The reflecting optical element mounted in the scanning head and rotatable about the same first axis. The radiation source is adapted to emit light to be output along a light beam path from the geodetic instrument via light reflection against the reflecting optical element. The control unit is adapted to adjust an angular displacement profile of the reflecting optical element about the first axis relative to an angular displacement profile of the scanning head such that an angular displacement of the light beam path about the first axis as a function of time presents a stair-like profile. The EDM unit is adapted to determine a distance to a target during a flat portion of the stair-like profile.

20 Claims, 6 Drawing Sheets

Related U.S. Application Data continuation of application No. PCT/EP2013/075654, filed on Dec. 5, 2013.

(58) Field of Classification Search
USPC .................................................. 33/290, 228
See application file for complete search history.

(56) References Cited

U.S. PATENT DOCUMENTS

| | | |
|---|---|---|
| 7,110,102 B2 | 9/2006 | Ohtomo et al. |
| 7,200,945 B2 | 4/2007 | Endo |
| 7,454,842 B2 | 11/2008 | Kodaira |
| 7,474,388 B2 | 1/2009 | Ohtomo et al. |
| 8,395,665 B2 | 3/2013 | Otani et al. |
| 8,581,978 B2 | 11/2013 | Kludas |
| 9,541,391 B2 | 1/2017 | Berg |
| 2012/0327271 A1* | 12/2012 | Nordenfelt .............. G01C 1/04 348/239 |
| 2014/0300886 A1 | 10/2014 | Zogg et al. |
| 2014/0373370 A1 | 12/2014 | Kodaira et al. |
| 2015/0052765 A1 | 2/2015 | Kumagai et al. |

OTHER PUBLICATIONS

U.S. Appl. No. 15/172,013, Notice of Allowance dated Sep. 6, 2016, 11 pages.

* cited by examiner

GEODETIC INSTRUMENTS AND METHODS OF OPERATING GEODETIC INSTRUMENTS

CROSS-REFERENCES TO RELATED APPLICATIONS

This application is a continuation of Ser. No. 15/172,013, filed Jun. 2, 2016, which is a continuation of International Application No. PCT/EP2013/075654, filed Dec. 5, 2013, the entire contents of both of which are incorporated herein by reference in their entirety for all purposes.

TECHNICAL FIELD

The present invention relates generally to the field of surveying. In particular, the present invention relates to geodetic instruments and methods of operating such geodetic instruments.

BACKGROUND OF THE INVENTION

The art of surveying involves the determination of unknown positions, surfaces or volumes of objects using measurements of angles and distances. For this purpose, a surveying instrument may comprise an electronic distance measuring device (EDM) which may be integrated in a so-called total station. A distance measuring total station combines electronic, optical and computer techniques and may furthermore be provided with a computer or control unit with writable information for controlling the measurements to be performed and for storing data obtained during the measurements.

Further, for establishing a land map or the appearance of a target such as a building or a wall of a building, it may often be desirable to perform a scan of the surveyed target or work site. For such applications, a distance measuring total station may be implemented as a geodetic scanner for determining the appearance of the target based on the measurements of distances to positions of interest at the surface of the target. Such a geodetic scanner may register the surface or volume of the target.

A difficulty with such geodetic scanners is to provide a sufficiently high measuring rate while still providing reliable measurements.

BRIEF SUMMARY OF THE INVENTION

According to a first general aspect, there is provided a method of operating a geodetic instrument. In this method, a scanning head of the geodetic instrument is rotated about a first axis according to a first angular displacement profile and a reflecting optical element mounted in the scanning head is rotated about the same first axis according to a second angular displacement profile. A light beam path for outputting light from the geodetic instrument is provided via light reflection against the reflecting optical element. The second angular displacement profile is adjusted relative to the first angular displacement profile such that an angular displacement of the light beam path about the first axis as a function of time presents a stair-like profile. A distance to a target is then determined during a flat portion of the stair-like profile.

According to a second general aspect, there is provided a geodetic instrument comprising a scanning head, a reflecting optical element, a radiation source, a control unit and an electronic distance measurement (EDM) unit. The scanning head is rotatable about a first axis and the reflecting optical element is mounted in the scanning head. The reflecting optical element is also rotatable about the same first axis. The radiation source is adapted to emit light to be output along a light beam path from the geodetic instrument via light reflection against the reflecting optical element. The control unit is adapted to adjust an angular displacement profile of the reflecting optical element relative to an angular displacement profile of the scanning head such that an angular displacement of the light beam path about the first axis as a function of time presents a stair-like profile. The EDM unit is configured to determine a distance to a target during a flat portion of the stair-like profile.

The above method and geodetic instrument are advantageous in that there is provided a scanning in which a measuring spot at a surface of a target may be moved from one position to another in a more effective manner. In these embodiments, the scanning head and the optical element are rotated relative to each other and independently of each other about the same axis such that an angular displacement of the light beam path about the first axis as a function of time has a stair-like profile. Depending on the first angular displacement profile with which the scanning head is rotated, the second angular displacement profile is adjusted to obtain a stair-like profile for the angular displacement of the light beam path (or light beam in case of continuous emission of light from the radiation source) about the first axis as a function of time.

In the present application, a stair-like profile defines an angular displacement profile which resembles the steps of a staircase or, in other words, a stair-like profile defines a light beam (or light beam path) moving with a pattern suggesting the steps of a staircase. The second angular displacement profile may be adjusted to periodically compensate for the first angular displacement profile in order to form the steps, or flat portions, of the stair-like profile.

It will be appreciated that a flat portion (or top part/side of a step) of the stair-like profile may correspond to a position at which the light beam path, or light beam in case of continuous emission of light from the radiation source, is still (not moving), or at least substantially still depending on the accuracy in the adjustments of the first and second angular displacement profiles. A flat portion corresponds therefore to a position, or a measuring spot, at a surface of a target in a scan performed by the geodetic instrument. Thus, the method and geodetic instrument described above are also advantageous in that a still light beam is output from the geodetic instrument at each step or flat portion, thereby providing for a more reliable determination of a distance to a target.

The reflecting optical element may be a scanning mirror, a scanning prism or any other optical element providing a reflective surface against which a light beam may be reflected and then output from the geodetic instrument.

According to an embodiment, the scanning head may be rotated continuously forward and the reflecting optical element may be rotated back and forth. In this embodiment, the speed of the backward rotation of the reflecting optical element may then be adjusted to compensate for the speed of the forward rotation of the scanning head in order to provide a still light beam path (or light beam in case of continuous light emission), i.e. to provide the flat portions of the stair-like profile. The combined effect of the forward rotations of the scanning head and of the reflecting optical element, as determined by the speeds of the forward rotations of the scanning head and of the reflecting optical element, contribute to the forward angular displacement of the light beam path about the first axis. Together with the periodicity of the back and forth rotation, these speeds of the scanning head and of the reflecting optical element determine the height of a step in the stair-like profile, i.e. the angular displacement of the light beam path at the target, which results in a distance between two measuring points (or positions) at the target scanned by the geodetic instrument.

According to an embodiment, the first angular displacement profile may be linear in a first angular direction while the second angular displacement profile may include linear portions in a second angular direction opposite to the first angular direction. In this embodiment, a rotation speed of the reflecting optical element in the linear portions is equal to a rotation speed of the scanning head. In a particular embodiment, the second angular displacement profile may be a saw-tooth pattern.

These embodiments are advantageous in that the scanning head, which is normally larger than the reflecting optical element, may be moved at a constant speed, i.e. without requiring acceleration. In these embodiments, the flat portions of the stair-like profile are provided by periodically rotating, at the same rotation speed, the optical element in a direction opposite to a direction in which the scanning head is rotated. During these time periods, the rotation of the optical element compensates for the rotation of the scanning head, thereby providing a still light beam path.

It will be appreciated that, although a saw-tooth pattern is described as an example for the second angular displacement profile in the above, any other second angular displacement profile which, in combination with the first angular displacement profile used for rotating the scanning head, results in a stair-like profile may be used for rotating the reflecting optical element.

In these embodiments, rotation of the scanning head and rotation of the reflecting optical element may be controlled via the control unit. More specifically, the control unit may send instructions causing the scanning head and the reflecting optical element to rotate in accordance with the first and the second angular displacement profiles, respectively.

In these embodiments, the combined effect of the rotations of the scanning head and of the reflecting optical element results in a displacement of a measuring spot or position in the scan to the next measuring spot (or position in the scan). These embodiments are advantageous in that it is possible to perform a scan in an effective way while achieving a sufficiently large grid spacing.

According to an embodiment, the geodetic instrument may further comprise a galvanometer, a piezoelectric actuator or a magnetostrictive actuator for rotating the reflecting optical element. The control unit may then be configured to provide instructions to one of these actuators for rotating the scanning head and the reflecting optical element in accordance with the first angular displacement profile and the second angular displacement profile, respectively. For example, a printed circuit board (PCB) piezo-motor has been shown to function adequately for controlling the reflective optical element according to a saw-tooth pattern. A PCB piezo-motor has the advantage of having a relatively high torque and low inertia, which is suitable for driving the reflecting optical element in a saw-tooth fashion.

According to an embodiment, the EDM unit may be adapted to determine a distance to a target based on time-of-flight measurements or phase-shift measurements.

In time-of-flight measurements (or pulse measurements), the time of flight of a laser pulse output from the geodetic instrument (or scanner) to a target and back again to the geodetic instrument is measured. The distance may then be determined using the speed of light.

Alternatively, the distance may be measured based on an amplitude modulation phase measurement method. In this method, emission of light pulses from the radiation source of the geodetic instrument (or scanner) to the target is controlled by base signals generated by e.g. a processor. A photodetector may then detect a signal representative of the reflected light pulses and transmit electric signals representative of the detected light pulses to the processor which calculates distances based on the phase difference between the electric signals and the base signals.

According to an embodiment, the EDM unit may be adapted to determine the distance by averaging values repetitively obtained during a flat portion of the stair-like profile. In other words, the EDM unit may be an "averaging" EDM with which the results obtained from several light pulses are averaged for a single measurement position of the scan. For a flat portion of the stair-like profile, a plurality of light pulses may be emitted and the distance to a target may be determined by averaging the time-of-flight values obtained based on signals received at a receiver (or sensor) for these light pulses (or, as mentioned above, based on phase difference between the electric signals and the base signals). An averaging EDM unit is advantageous as it is usually a much lower cost alternative as the power of each of the light pulses may be lowered (thereby requiring a less expensive radiation source) and the processing of the received light pulses may be less complex as it is e.g. easier to remove noise from several signals (thereby requiring a less advanced receiver). The above method and geodetic instrument are therefore advantageous in that it enables the use of an averaging EDM as it is possible to keep the measuring spot (or light beam path or light beam) still while averaging and, at the same time, still be able to move the measuring spot from one position to another in an effective manner. These advantages are also valid for an EDM unit based on the use of a continuous periodically modulated wave, i.e. based on amplitude modulation phase measurement during which the phase of a received signal is compared with the phase of an emitted periodically modulated signal to determine a phase shift (and thereby a distance).

According to a third general aspect, there is provided a method of operating a geodetic instrument. In this method, a center unit mounted on a base of the geodetic instrument is rotated about either one of a first axis and a second axis and a reflecting optical element rotationally mounted in the center unit is rotated about the same first or second axis. Light reflection at the reflecting optical element provides a light beam path along which light is to be output from the geodetic instrument. The respective rotations of the center unit and the reflecting optical element are controlled such that an angular displacement of the light beam path about either one of the first axis and the second axis as a function of time results in a stair-like profile. A distance to a target may be measured based on detection of a signal representative of reflection of the light against the target during a flat portion of the stair-like profile.

According to a fourth general aspect, there is provided a geodetic instrument comprising a center unit, a reflecting optical element, a light source, a control unit and a processing unit. The center unit is rotationally mounted on a base for rotation about a first axis and/or a second axis. The reflecting optical element is rotationally mounted in the center unit for rotation about the first axis and/or the second axis. The light source is adpated to emit light to be output along a light beam path from the geodetic instrument via light reflection at the reflecting optical element. The control unit is adapted to control the (respective) rotations of the center unit and the reflecting optical element such that an angular displacement of the light beam path about either one of the first axis and the second axis as a function of time results in a stair-like profile. The processing unit is configured to measure a distance to a target based on detection of a signal representative of reflection of the light against the target during a flat portion of the stair-like profile.

According to an embodiment, the stair-like profile may be obtained by controlling the rotation of the center unit at a constant speed in a first rotational direction about either one of the first axis and the second axis and by periodically controlling the rotation of the reflecting optical element, at the same constant speed, in a rotational direction opposite to the first rotational direction about the same axis. Although it is intended to control the rotation of the reflecting optical element at the same speed as the rotation of the center unit during some periods of time for providing flat portions of the stair-like profile, it will be appreciated that some variations may occur (at least depending on the accuracy in controlling these rotational speeds).

The positions at which the light beam path (or light beam in case of continuous emission of light from the light source or the radiation source) is directed may cover at least a region of the surface of a target, thereby providing a number of measuring points. The measuring points may be arranged as a matrix of lines and columns along a horizontal direction and a vertical direction. For this purpose, the first axis may be arranged along a horizontal direction and the second axis may be arranged along a vertical direction.

According to a fifth general aspect, there is provided a computer program product comprising computer-executable components for performing a method according to any one of the above described embodiments when the computer-executable components are executed on a processing unit. The computer program product may for example be loadable into an internal memory of a geodetic instrument according to the second or fourth aspect, comprising software code portions for causing a control unit or processor of the geodetic instrument to perform steps in accordance with the first or third aspect, respectively.

According to a sixth general aspect, there is provided a computer-readable digital storage medium comprising a computer program product comprising computer-executable components adapted to, when executed on a processing unit, perform a method according to any one of the above described embodiments.

It will be appreciated that other embodiments using all possible combinations of features recited in the above described embodiments and aspects may be envisaged.

Exemplifying embodiments will now be described in more detail, with reference to the following appended drawings.

BRIEF DESCRIPTION OF THE DRAWINGS

DETAILED DESCRIPTION OF THE INVENTION

As illustrated in the figures, the sizes of the elements, layers and regions may be exaggerated for illustrative purposes and, thus, are provided to illustrate the general structures of the embodiments. Like reference numerals refer to like elements throughout.

Exemplifying embodiments will now be described more fully hereinafter with reference to the accompanying drawings, in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1:
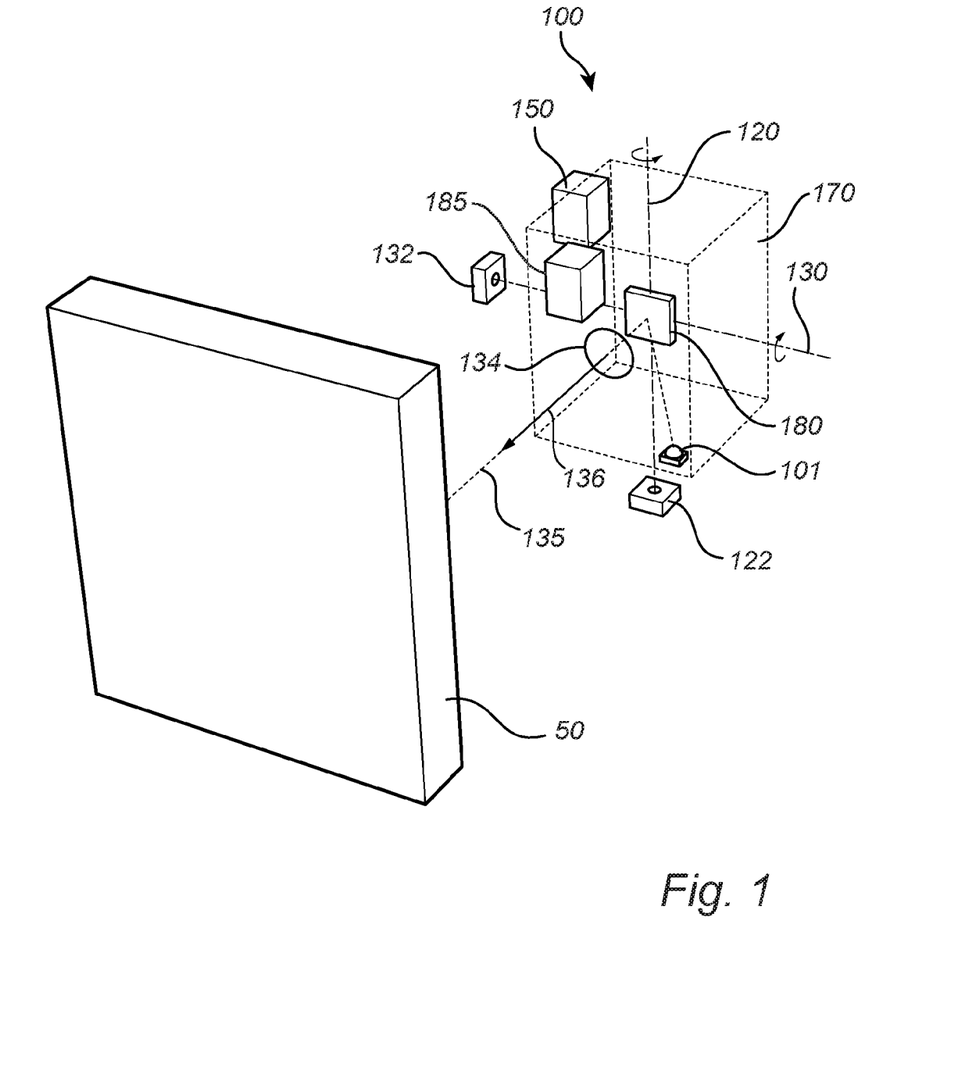
FIG. 1 shows a schematic view of a geodetic instrument in accordance with an embodiment.

With reference to FIG. 1, a geodetic instrument according to an embodiment is described.

FIG. 1 shows a schematic view of a geodetic instrument 100, such as a geodetic scanner. The geodetic instrument includes a scanning head 170, a reflecting optical element 180, a radiation source 101, a control unit 150, and an electronic distance measurement (EDM) unit (or at least a processor) 185.

The scanning head 170 is rotatable about a first axis 120. In particular, the scanning head 170 may be rotated about the first axis 120 in accordance with a first angular displacement profile, i.e. in accordance with a certain speed and a certain orientation of the rotation about the first axis 120. It will be appreciated that the speed and/or the orientation of the rotation of the scanning head 170 about the first axis 120 may be varied with time, thereby resulting in a (specific) first angular displacement profile.

The reflecting optical element 180 is mounted in (or within) the scanning head 170 and is rotatable about the same first axis 120. The reflecting optical element 180 is rotatable about the first axis relative to the scanning head 170. In other words, the scanning head 170 and the reflecting optical element 180 are rotatable about the first axis 120 independently of each other. The reflective optical element 180 may be rotated about the first axis 120 in accordance with a second angular displacement profile, i.e. in accordance with a certain speed and a certain orientation of the rotation about the first axis 120. It will be appreciated that the speed and/or the orientation of the rotation of the reflecting optical element 180 about the first axis 120 may be varied with time, thereby resulting in a (specific) second angular displacement profile.

In addition, it will be appreciated that, for providing a two-dimensional scan, the scanning head 170 and the reflecting optical element 180 may also be rotatable about a second axis 130. The first axis 120 may for example be along a vertical direction while the second axis 130 may for example be along a horizontal direction.

The radiation source 101 is adapted to emit a light beam (or electromagnetic radiation beam) 136 which, via light reflection against the reflecting optical element 180, is output from the geodetic instrument 100 along a light beam path or optical path 135 corresponding to a line of sight 135 of the geodetic instrument. The radiation source 101 may emit a laser beam 136 at a specific wavelength or within a specific range of wavelengths. For example, the radiation source 101 may emit red or infrared light, i.e. light of a wavelength of 850 nm and above. For safety reasons, the radiation source 101 may preferably emit at 1500 nm. However, the laser source of a geodetic scanner implemented in accordance with the present embodiments is not limited to a specific wavelength.

For driving the rotation of the scanning head 170, the geodetic scanner 100 may comprise a scanning device or scanning platform. The scanning device may comprise a horizontal deflection unit 132 and a vertical deflection unit 122 in order to rotate the scanning head 170 and the reflecting optical element 180 about the first axis 120 (the vertical axis in FIG. 1) and the second axis (the horizontal axis in FIG. 1), respectively. Accordingly, the light beam path 135, and consequently the light beam 136 when the radiation source 101 is turned on, can be moved, i.e. a scan of a target 50 can be performed, along a vertical direction or a horizontal direction, respectively. Each of these deflection units may comprise a deflection motor.

The control unit 150 may be adapted to adjust the second angular displacement profile of the reflecting optical element 180 about the first axis 120 relative to the first angular displacement profile of the scanning head 170 such that an angular displacement of the light beam path 135 (and consequently the light beam 136 when the radiation source 101 is turned on) about the first axis 120 as a function of time presents a stair-like profile.

The control unit 150 may be adapted to cause the scanning head 170 (e.g. via the vertical deflection unit 122 of the scanning device) to rotate about the first axis 120 at a constant rotation speed in a first angular direction and to cause the reflecting optical element 180 to periodically rotate about the first axis 120 at the same constant speed in an angular direction opposite to the first angular direction.

The control unit 150 may for example be adapted to cause rotation of the scanning head 170 continuously forward and to cause rotation of the reflecting optical element 180 back and forth. As will be described in further detail with reference to FIG. 4, the angular second displacement profile may be a saw-tooth pattern.

For a flat portion of the stair-like profile, the line of sight 135, or the light beam 136, is still relative to the ground. Each of the flat portions of the stair-like profile may then correspond to a specific position at the target 50. In other words, for each of the flat portions, the geodetic scanner 100 aims at a specific (or desired) position at the target 50. Accordingly, the EDM unit or the processor 185 may be adapted to determine a distance to the target 50 during a flat portion of the stair-like profile.

For this purpose, during a flat portion of the stair-like profile, a light pulse may be emitted by the light source 101 and directed towards the desired position at the target 50 via reflection against the reflecting optical element 180. The light pulse that is reflected against the target 50 is received at a receiver or sensor connected to a processor 185 of the geodetic instrument 100. The receiver may be a light sensitive detector adapted to detect a laser beam. For example, the receiver may be a semiconductor-based photodetector such as an avalanche photodiode (APD) or a pin diode. The photodetector may preferably be sensitive to the wavelength at which the radiation source 101 emits.

It will be appreciated that transmission and reception of light pulses along the line of sight 135 may be performed by an EDM unit 185. In other words, the processor described above, the light source and the receiver may in an alternative embodiment be integrated in a single EDM unit 185. Thus, although the light source 101 is represented to be external to the EDM unit 185 in FIG. 1 for illustrative purposes, the light source 101 may also be part of the EDM unit 385. It will be appreciated that elements providing for emission of the light beam, reception of a light beam reflected at the target 50 and processing of the corresponding signals may be either integrated in a single unit or provided as separate elements.

A signal representative of the reflected light pulse received at the receiver may then be processed at the processor or EDM unit 185 and a distance between the geodetic instrument 100 and the target 50 for the desired position may be calculated. In an embodiment, the EDM unit 185 may include a processor with logic and software for calculating a distance to a position of a target based on a signal representative of a reflected light pulse.

Further, the EDM unit 185 may be adapted to determine a distance to a position of the target 50 by averaging values repetitively obtained during a flat portion of the stair-like profile. As previously mentioned, the distance may be measured based on time of flight measurements or based on an amplitude modulation phase measurement method or other types of EDMs, e.g. an EDM based on frequency-modulated continuous wave (FMCW) with coherent detection.

The scanning head 170 and the reflecting optical element 180 may be rotated such that a stair-like profile with a plurality of steps is obtained, thereby providing a plurality of positions at the target 50, i.e. a scan. By controlling the rotations of the scanning head 170 and the reflecting optical element 180 about the first axis 120 and the second axis 130, a two-dimensional scan of the target 50 may be obtained. The geodetic instrument 100 may therefore be used for determining the appearance of the target 50.

The reflecting optical element 180 may be a scanning mirror or a scanning prism. A galvanometer, a piezoelectric actuator or a magnetostrictive actuator, as may be integrated in each of the deflection units 132 and 122, may be used for causing rotation of the reflecting optical element 180 according to instructions received from the control unit 150.

Figure 2:
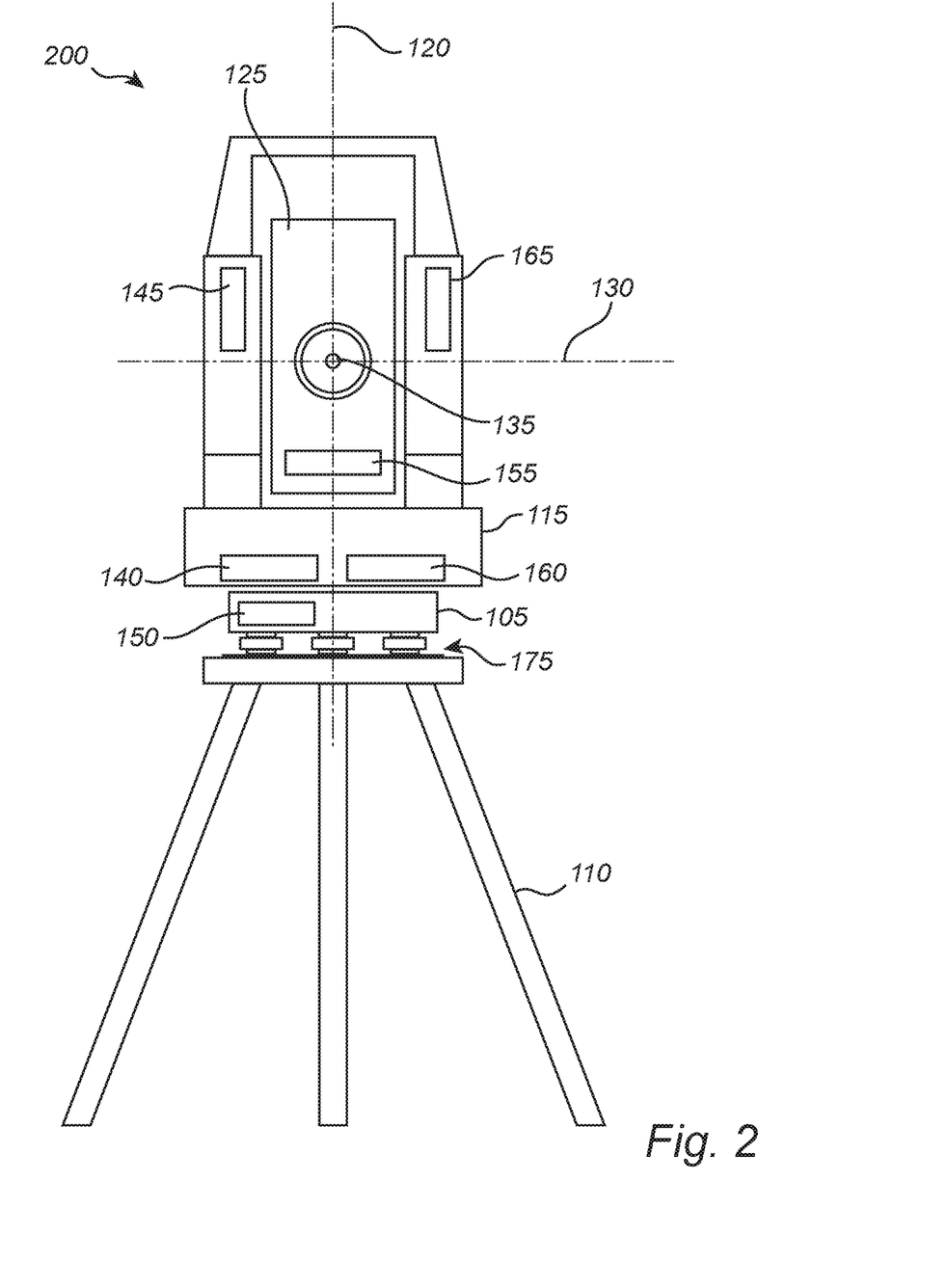
FIG. 2 shows a schematic view of a geodetic instrument in accordance with another embodiment.

With reference to FIG. 2, a geodetic instrument 200 according to another embodiment is described.

FIG. 2 shows a schematic view of a geodetic instrument 200, for example a total station, which may be operated in a scanning mode. The total station 200 comprises a base 105, an alidade 115 mounted on the base for rotation about a vertical axis 120 and a center unit 125 mounted on the alidade for rotation about a horizontal axis 130.

The total station 200 may further comprise a control unit or controller 150. In FIG. 2, the controller 150 is shown to be arranged at the base 105 of the total station 200. However, the controller 150 may also be arranged at e.g. the alidade 115 or the center unit 125. According to an embodiment, the controller 150 may be a remote unit which communicates with the total station and its element, such as the center unit 125, by wireless communication.

As shown in FIG. 2, the base 105 of the instrument 200 may be mounted on a tripod 110. The base 105 is a non-rotating part of the total station 200 and may be mounted on a tribrach 175 for levelling purposes.

The center unit 125 may comprise a sighting axis or line of sight 135. A controllable drive 140 may be provided for rotating the alidade 115 about the vertical axis 120 in response to a horizontal angle control signal. An angle sensor 160, such as an angular encoder or a magnetic or capacitive angle resolver, produces a horizontal measurement signal, representing the horizontal angular position of the alidade 115 relative to the base 105. Similarly, a controllable drive 145 is provided for rotating the center unit 125 about the horizontal axis 130 in response to a vertical angle control signal, and an angle sensor 165 is provided for producing a vertical measurement signal, representing the vertical angular position of the center unit 125 relative to the alidade 115.

In operation, the base 105 may be installed on the tripod 110 at a desired angular orientation relative to a horizontal reference external to the total station, such as geodetic or magnetic north, and with the vertical rotation axis 120 typically plumb. As the drive 140 rotates the alidade 115, the horizontal measurement signal indicates instantaneous angular orientation of the alidade relative to the base 105. Similarly, as the drive 145 rotates the center unit 125, the vertical measurement signal indicates instantaneous angular orientation of the center unit relative to the alidade. Input signals for the drives 140, 145 may be provided by the controller 150.

Figure 3:
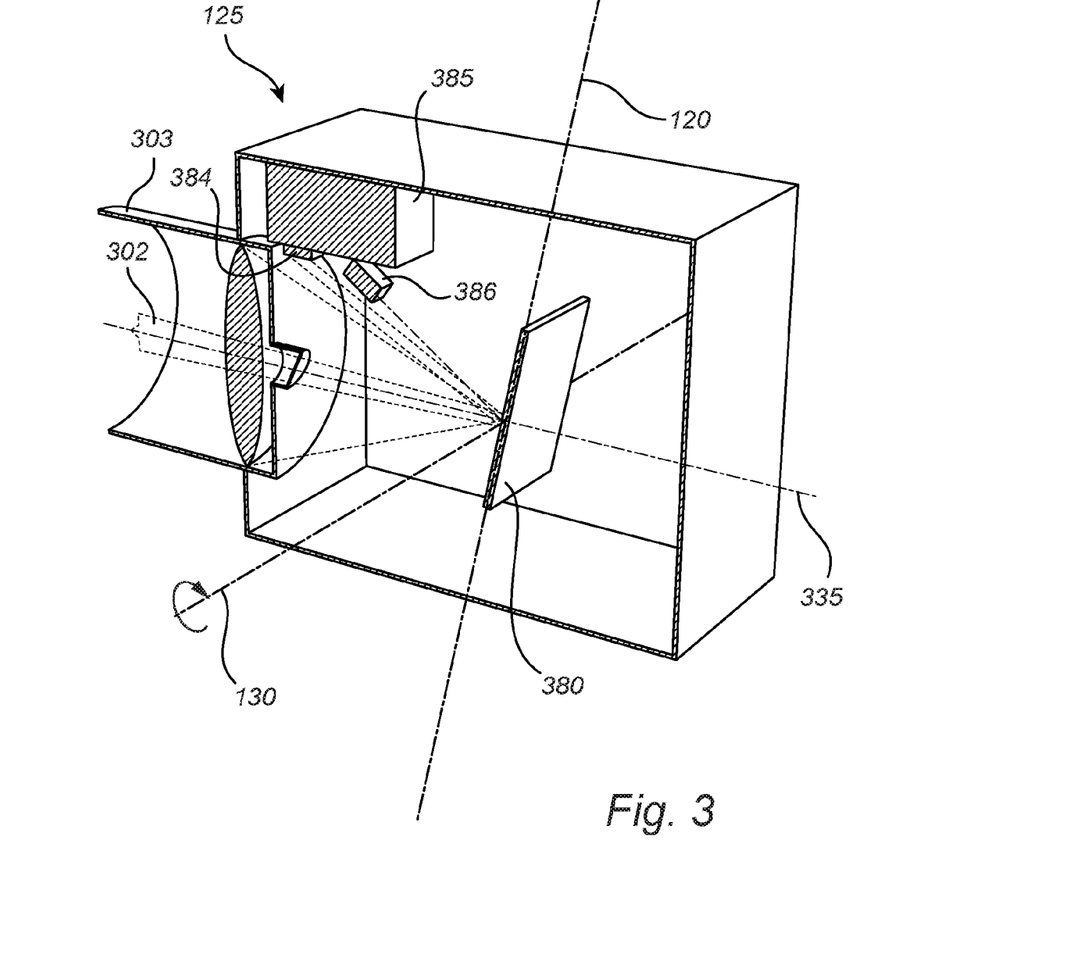
FIG. 3 shows a schematic view of a center unit of a geodetic instrument in accordance with an embodiment.

With reference to FIG. 3, a center unit in accordance with an embodiment is described. The center unit 125 shown in FIG. 3 is an example of the center unit 125 shown in FIG. 2.

FIG. 3 shows a side view of the center unit 125. It will be appreciated that FIG. 3 shows only a number of components that a center unit may comprise. In, for example, WO 2004001333 by the same applicant, a center unit is described in more detail. Such center units may be used in the total station 200 described with reference to FIG. 2.

In the center unit 125, there is provided an electronic distance measurement unit (EDM unit) or processor generally designated 385. The EDM unit 385 operates generally in the direction of the optical center of the center unit 125, i.e. along the line of sight 335 (135 in FIG. 2), within the overlap between the angular cones defined by a transmitting optical channel 302 and a receiving optical channel 303. The divergence of the angular cone 302 is determined primarily by the transmitting and receiving optics in the center unit 125. The center unit 125 may comprise a transmitter (or radiation source 384) for transmitting a radiation beam within the transmitting optical channel 302 and a receiver 386 for receiving within the receiving optical channel 303 a radiation beam that is reflected against e.g. a target (not shown in FIGS. 2 and 3). The radiation beam emitted from the radiation source 384 may be transmitted towards a scanning mirror 380 which is rotatable about the horizontal axis 130 and the vertical axis 120. The radiation beam is then output of the center unit 125 within the transmitting optical channel 302 via reflection against the scanning mirror 380. The EDM unit or processor 385 may then calculate the distance between a target and the center unit 125 (i.e. the total station 200) based on the signals received at the receiver 386.

The radiation source 384 and the receiver 386 may be integrated within the EDM unit 385. A radiation beam is then emitted from the radiation source 384, also called transmitter, as light towards the surface of a target (or scene) (via reflection against a scanning mirror 380) and the light beam that is reflected against the surface of the target is detected by a receiver 386, thereby generating a signal. As mentioned above, the receiver 386 may be located at the EDM unit 385 and receive the light pulse reflected at the target via e.g. reflection against the scanning mirror 380. Processing of the detected signal according to e.g. a time of flight measurement method or modulation phase shift measurement method enables the determination of the distance to the surface, i.e. the distance between the EDM unit and the target.

Accuracy of the measurements relies in part on mechanical stability of the geodetic instrument. In particular, the instrument performs accurate measurements if the various axis of the instrument are perfectly parallel or perpendicular to each other. For example, the axis of the EDM unit 385 is preferably parallel to the axis of the center unit 125, i.e. the line of sight 135 of the total station 200. However, any deviation may be compensated for at the processing of the EDM unit for instance by means of a calibration procedure.

As mentioned above, the center unit 125 described with reference to FIG. 3 is an example of the center unit 125 of the total station 200 described with reference to FIG. 2.

The measurements made by the total station 200 may in general be distance measurements provided by the EDM unit 385 and/or angle measurements provided by the angle sensors 160, 165.

The positions scanned at the surface of a target by the total station 200 in the scanning mode are determined by the rotation of the scanning mirror 380 and the center unit 125 about the vertical axis 120 and the horizontal axis 130.

A horizontal scanning of a surface of a target by the light beam emitted by the transmitter of the EDM unit arranged in the center unit 125 is determined by the rotation of the alidade 115, and thereby of the center unit 125 mounted on it, and the rotation of the scanning mirror 380 of the center unit 125 about the vertical axis 120. The rotations of the alidade 115 and of the scanning mirror 380 about the vertical axis 120 may be controlled such that an angular displacement of the light beam about the vertical axis 120 as a function of time presents a stair-like profile.

A vertical scanning of a surface of a target by the light beam emitted by the transmitter of the EDM unit arranged in the center unit 125 is determined by the rotation of the center unit 125 and the rotation of the scanning mirror 380 of the center unit 125 about the horizontal axis 130. The rotations of the center unit 125 and of the scanning mirror 380 about the horizontal axis 130 may be controlled such that an angular displacement of the light beam about the horizontal axis 130 as a function of time presents a stair-like profile.

The combination of a vertical scanning and a horizontal scanning results in a two-dimensional scanning of a target. The appearance of a target may then be determined via calculation of the distances to the target for each of the positions of the two-dimensional scan. The control unit 150 of the total station 200 may be configured to alternate between vertical and horizontal scanning.

It will be appreciated that, although reference was made in the above examples to the light beam for defining the horizontal scanning and the vertical scanning, reference may have been made to the light beam path or line of sight instead.

Generally, it will be appreciated that, in the above described embodiments, light is emitted from the geodetic instrument during a flat portion of the stair-like profile. For this purpose, the light source or radiation source of the geodetic instrument may be either continuously turned on or periodically turned on. If the light source (or radiation source) is continuously turned on, which is preferable for stability in terms of e.g. light power, the light beam itself presents a stair-like profile. However, the light source may be turned off while the measurement spot moves from one position to another and only turned on for the distance measurement performed during a flat portion of the stair-like profile of the light beam path. In other words, it may be envisaged to interrupt emission of light from the light source while not measuring. In particular, the control unit may be configured to synchronize emission of light from the light source, or the radiation source, with the determination or measurement of the distance to the target during a flat portion of the stair-like profile.

Figure 4:
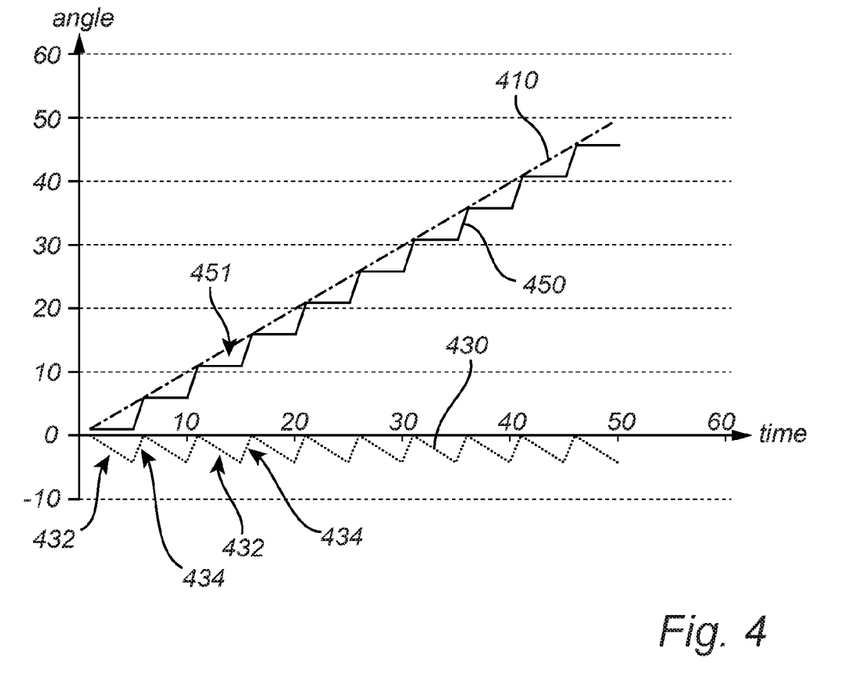
FIG. 4 shows a graph illustrating examples of angular displacement profiles according to an embodiment.

Referring to FIG. 4, an example of angular displacement profiles used for the alidade 115 and the scanning mirror 380 is described. Although reference will be made to the elements of the total station 200 described with reference to FIG. 2 in the following, it will be appreciated that the same example would be valid for the control of the rotations of the scanning head 170 and the reflecting optical element 180 described with reference to FIG. 1, with the alidade 115 corresponding to the scanning head 170.

FIG. 4 shows a graph in which the angular displacement profile of the alidade 115 is represented by a dashed line 410, the angular displacement profile of the scanning mirror 180 is represented by a dotted line 430 and the resulting angular displacement of the light beam (or of the light beam path or of the line of sight of the total station 200) is a continuous line 450. The horizontal axis of the graph represents the time while the vertical axis of the graph represents an angular displacement.

In this example, the alidade 115 is rotated continuously forward about the vertical axis 120, at a constant speed towards the same rotational direction. As a result, the angular displacement profile 410 of the alidade 115 is linearly dependent on time, as represented in the graph shown in FIG. 4. The slope of the linear curve 410 is determined by the angular rotation speed. Further, the scanning mirror 380 is rotated about the same vertical axis 120 back and forth, i.e. either in the same rotational direction as the alidade 115 or in the opposite direction. The angular displacement profile 430 of the scanning mirror 380 about the vertical axis 120 may be represented in the graph shown in FIG. 4 by a saw-tooth pattern. The angular displacement profile 430 of the scanning mirror 380 includes a first type of portions or segments 432, which correspond to a rotation of the scanning mirror 380 about the vertical axis 120 in a direction opposite to the rotation of the alidade 115, and a second type of portions or segments 434, which correspond to a rotation of the scanning mirror 380 about the vertical axis 120 in the same direction as the rotation of the alidade 115. For the case of a saw-tooth pattern, the second angular displacement profile 430 includes repetition of a sequence comprising a segment of the first type followed by a segment of the second type.

The slope of the angular displacement profile 430 for the first type of segments 432 is determined by the speed of the rotation of the scanning mirror 380 about the vertical axis 120. As the alidade 115 and the scanning mirror 380 rotates opposite to each other about the vertical axis 120, if the rotational speed of the alidade is equal to, or at least close to, the rotational speed of the scanning mirror 380, then the rotations of the scanning mirror 380 and of the alidade 115 compensate each other such that the angular displacement 450 of the light beam (or light beam path) about the vertical axis 120 is negligible, and preferably null, thereby resulting in a flat portion 451 of the stair-like profile 450.

The length of a flat portion of the stair-like profile is determined by the time during which the scanning mirror 380 and the alidade 115 are rotated opposite to each other about the vertical axis 120. The length of a flat portion of the stair-like profile determines the time period during which the light beam is still at a particular measuring spot (i.e. a particular position at the surface of the target). This in turn determines the time available for the EDM unit to perform a measurement at a particular position of the target.

The operation of the EDM unit may therefore be synchronized with the rotations of the scanning mirror 380 and the center unit 125, via e.g. synchronization with the control unit 150.

The slope of the angular displacement profile 430 for the second type of segments 434 is determined by the speed of the rotation of the scanning mirror 380 about the vertical axis 120. As the alidade 115 and the scanning mirror 380 rotates in the same direction about the vertical axis 120, the combined effect of the rotation of the scanning mirror 380 and the alidade 115 determines the angular displacement 450 of the light beam path about the vertical axis 120. Thus, the rotation speed of the scanning mirror 380 and the rotation speed of the alidade 115 determines the spacing between two measuring spots in the scan.

It will be appreciated that the angular displacement profiles shown in FIG. 4 only illustrates an example of controlling the alidade 115 and the scanning mirror 380 about the vertical axis 120 for obtaining a stair-like profile such as denoted by 450. Although linear angular displacements may facilitate the control of rotations of the alidade 115 and of the scanning mirror 380, other types of more advanced angular displacement profiles may be envisaged, as long as the resulting angular displacement profile for the light beam (or the light beam path) about the vertical axis 120 is a stair-like profile.

Further, although the above example has been described with reference to rotation about the vertical axis 120, it will be appreciated that the same example and the same generalization may be made for a control of the rotation of the center unit 125 and the scanning mirror 380 about the horizontal axis 130.

Figure 5:
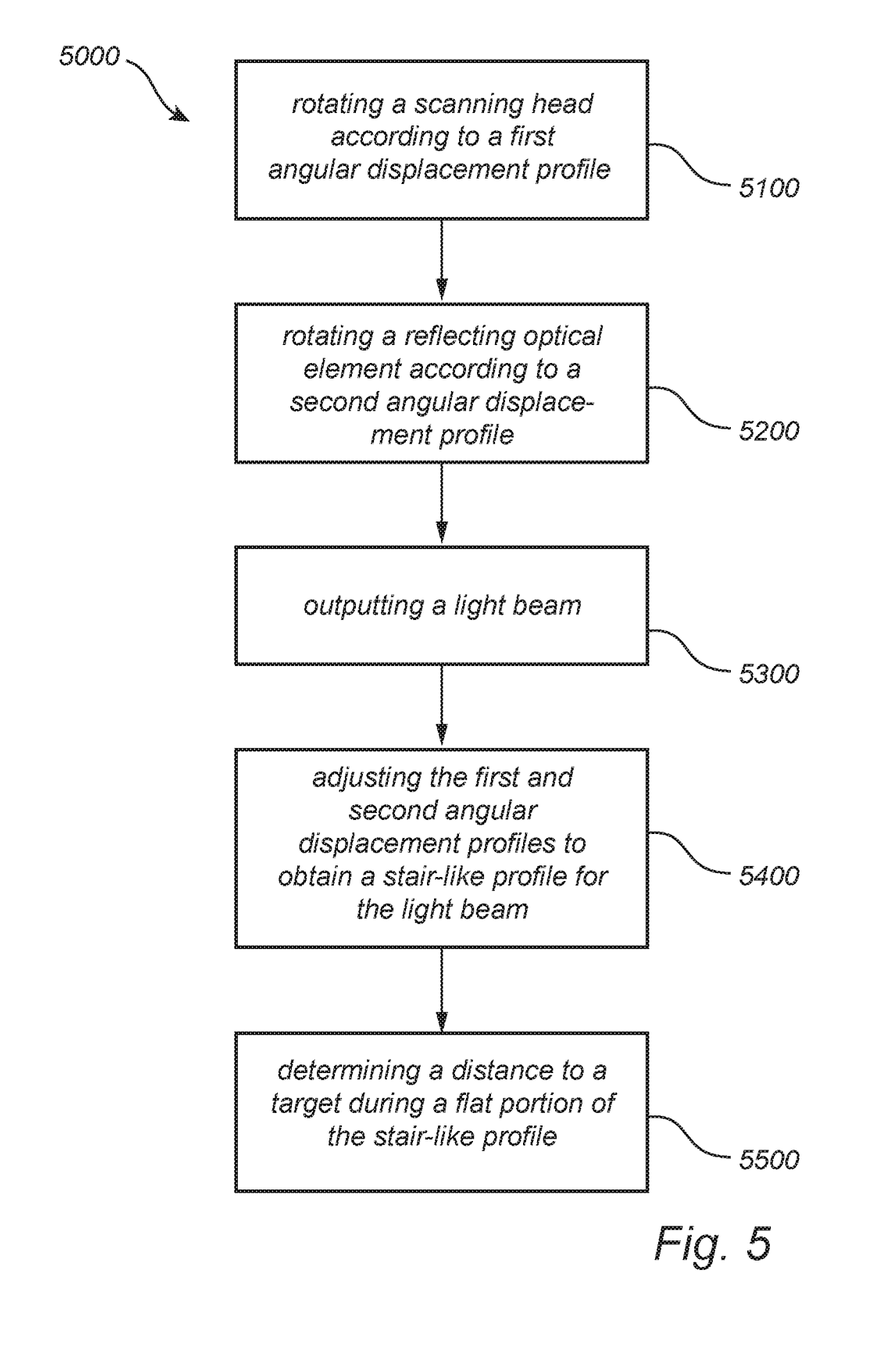
FIG. 5 illustrates the outline of a method of operating a geodetic instrument in accordance with an embodiment.

With reference to FIG. 5, the outline of a method of operating a geodetic instrument in accordance with an embodiment is described.

The method of the present embodiment may be implemented in a geodetic instrument in accordance with any one of the embodiments described with reference to FIGS. 1-4. The method of the present embodiment may also be implemented in any geodetic instruments providing rotation of a scanning mirror (or reflecting optical element) relative to rotation of a scanning head at which the scanning mirror is arranged.

The method of the present embodiment comprises rotating (5100) a scanning head of the geodetic instrument about a first axis according to a first angular displacement profile and rotating (5200) about the same first axis a reflecting optical element mounted in the scanning head according to a second angular displacement profile. A light beam path for outputting light from the geodetic instrument is provided via reflection of light against the reflecting optical element. Thus, the method may comprise outputting (5300), at least periodically, a light beam along the light beam path. The method comprises also adjusting (5400) the second angular displacement profile relative to the first angular displacement profile such that an angular displacement of the light beam path (or the light beam) about the first axis as a function of time presents a stair-like profile. The method further comprises determining (5500) a distance to a target during a flat portion of the stair-like profile.

Figure 6:
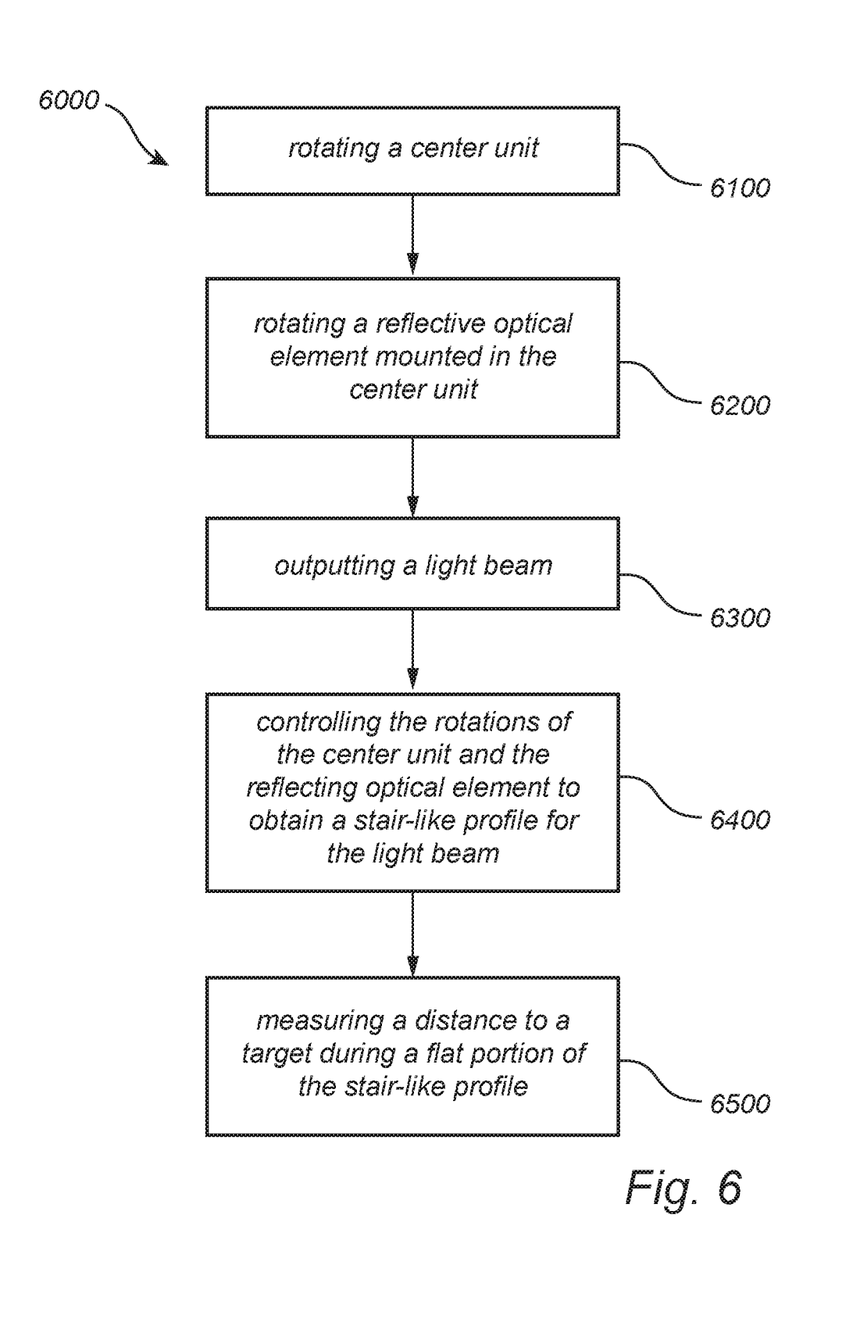
FIG. 6 illustrates the outline of a method of operating a geodetic instrument in accordance with another embodiment.

With reference to FIG. 6, the outline of a method of operating a geodetic instrument in accordance with another embodiment is described.

The method of the present embodiment may be implemented in a geodetic instrument in accordance with any one of the embodiments described with reference to FIGS. 1-4. The method of the present embodiment may also be implemented in any geodetic instruments providing rotation of a reflecting optical element (or scanning mirror) relative to rotation of a scanning head or center unit at which the reflecting optical element is arranged.

The method of the present embodiment comprises rotating (6100) about either one of a first axis and a second axis a center unit mounted on a base of the geodetic instrument and rotating (6200) about the same first or second axis a reflecting optical element rotationally mounted in the center unit. Light reflection at the reflecting optical element provides a light beam path along which light is to be output from the geodetic instrument. The method comprises also controlling (6400) the respective rotations of the center unit and the reflecting optical element such that an angular displacement of the light beam path about either one of the first axis and the second axis as a function of time results in a stair-like profile, and measuring (6500) a distance to a target based on detection of a signal representative of reflection of the light beam against the target during a flat portion of the stair-like profile.

In case of continuous light emission or for at least measuring the distance to the target, the method may also include outputting (6300) a light beam from the geodetic instrument along the light beam path.

The methods described above with reference to FIGS. 5 and 6 may be combined with any of the features of the embodiments described above with reference to FIGS. 1-4.

It will be appreciated that in the above described methods the light beam may be periodically output during the flat portions of the stair-like profile for determining distances to a number of positions of interest at the target, as determined by the angular positions corresponding to the flat portions. Alternatively, the light beam may be continuously output from the geodetic instrument, the determining or the measuring of the distances to positions of interest at the target being performed during the flat portions of the stair-like profile.

The above described embodiments are applicable for several types of geodetic scanners, laser radars, electronic measuring devices, measuring devices and/or total stations equipped with a scanning device or scanning function together with a rotating (or scanning) reflective optical element.

The person skilled in the art realizes that the present invention by no means is limited to the preferred embodiments described above. On the contrary, many modifications and variations are possible within the scope of the appended claims.

Further, although applications of the above embodiments have been described with reference to surveying, other applications may be envisaged.

Although features and elements are described above in particular combinations, each feature or element can be used alone without the other features and elements or in various combinations with or without other features and elements. In the above, a processor or processing unit may include, by way of example, a general purpose processor, a special purpose processor, a conventional processor, a digital signal processor (DSP), a plurality of microprocessors, one or more microprocessors in association with a DSP core, and any other type of integrated circuit (IC).

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage.

What is claimed is:

1. A total station comprising:
   a center unit, the center unit comprising:
      a reflecting optical element mounted in the center unit and rotatable about an axis, wherein:
         the reflecting optical element is rotatable relative to the central unit; and
         the rotation of the reflecting optical element determines positions scanned at a surface of a target by the total station in a scanning mode;
      a radiation source adapted to emit light to be output along an output light beam path from the total station via light reflection against the reflecting optical element; and
      a receiver adapted to receive light entering the total station along an input light beam path; and
   an electronic distance measurement (EDM) unit adapted to determine a distance to a position at the target based on a signal representative of light received at the receiver.

2. The total station of claim 1, wherein the center unit further comprises an optical element arranged in the output light beam path, wherein the reflecting optical element is optically located between the radiation source and the optical element.

3. The total station of claim 2, wherein the optical element is configured to define a divergence of an angular cone of the output light beam path.

4. The total station of claim 1, wherein the receiver is adapted to receive light entering the total station along the input light beam path via light reflection against the reflecting optical element.

5. The total station of claim 1, wherein the center unit is rotatable about the axis, the total station further comprising a control unit adapted to adjust an angular displacement profile of the reflecting optical element relative to an angular displacement profile of the center unit for controlling angular displacement of the output light beam path about the axis.

6. The total station of claim 1, further comprising:
   a base; and
   an alidade mounted on the base for rotation about a vertical axis, wherein the center unit is mounted on the alidade for rotation about a horizontal axis.

7. The total station of claim 6, further comprising:
   a first controllable drive for rotating the alidade about the vertical axis; and
   a second controllable drive for rotating the center unit about the horizontal axis.

8. The total station of claim 6, wherein:
   the reflecting optical element is rotatable about the horizontal axis and the vertical axis; and
   the total station further comprises a control unit adapted to control respective rotations of the center unit, the alidade, and the reflecting optical element for controlling angular displacement of the output light beam path about the horizontal axis and the vertical axis.

9. The total station of claim 1, wherein the EDM unit is adapted to determine a distance to the target based on time-of-flight measurements or phase-shift measurements.

10. The total station of claim 1, further comprising at least one of a galvanometer, a piezoelectric actuator, and a magnetostrictive actuator for rotating the reflecting optical element.

11. The total station of claim 1, wherein the reflecting optical element is a scanning mirror or a scanning prism.

12. A total station comprising:
a scanning head comprising:
   a reflecting optical element mounted in the scanning head and rotatable about an axis, wherein:
      the reflecting optical element is rotatable relative to a center unit of the total station; and
      the rotation of the reflecting optical element determines positions scanned at a surface of a target by the total station in a scanning mode;
   a radiation source adapted to emit light to be output from the total station within a transmitting optical channel via reflection against the reflecting optical element; and
   a receiver adapted to receive light entering the total station within a receiving optical channel; and
an electronic distance measurement (EDM) unit adapted to determine a distance to a position at the target based on a signal representative of light received at the receiver.

13. The total station of claim 12, wherein:
the scanning head further comprises an optical element arranged in an output light beam path of the total station; and
the reflecting optical element is optically located between the radiation source and the optical element.

14. The total station of claim 13, wherein the optical element is configured to define a divergence of an angular cone of the transmitting optical channel.

15. The total station of claim 12, wherein the receiver is adapted to receive, via light reflection against the reflecting optical element, light entering the total station within the receiving optical channel.

16. The total station of claim 12, wherein:
the scanning head is rotatable about the axis;
the total station further comprises a control unit adapted to adjust an angular displacement profile of the reflecting optical element relative to an angular displacement profile of the scanning head for controlling angular displacement about the axis of light output by the total station.

17. The total station of claim 12, further comprising:
a base; and
an alidade mounted on the base for rotation about a vertical axis, wherein the scanning head is mounted on the alidade for rotation about a horizontal axis.

18. The total station of claim 17, further comprising:
a first controllable drive for rotating the alidade about the vertical axis; and
a second controllable drive for rotating the scanning head unit about the horizontal axis.

19. The total station of claim 17, wherein:
the reflecting optical element is rotatable about the horizontal axis and the vertical axis; and
the total station further comprises a control unit adapted to control respective rotations of the scanning head, the alidade, and the reflecting optical element for controlling angular displacement, about the horizontal axis and the vertical axis, of light output by the total station.

20. The total station of claim 12, wherein the reflecting optical element is a scanning mirror or a scanning prism.

* * * * *